United States Patent

[11] 3,570,439

[72] Inventor Charles D. Snelling
2949 Greenleaf Ave., Allentown, Pa. 18103
[21] Appl. No. 787,068
[22] Filed Dec. 26, 1968
[45] Patented Mar. 16, 1971

[54] NAVIGATION CONTROL MECHANISM
22 Claims, 11 Drawing Figs.
[52] U.S. Cl. ................................................ 114/146,
115/0.5A, 114/60
[51] Int. Cl. ............................................ B63h 21/26
[50] Field of Search ......................................... 114/60, 70,
146; 74/494, 493; 64/2; 180/19 (H); 115/0.5

[56] References Cited
UNITED STATES PATENTS
| | | | |
|---|---|---|---|
| 871,109 | 11/1907 | Coates | 74/493 |
| 1,548,411 | 8/1925 | Derr | 74/493 |
| 2,039,399 | 5/1936 | Englis | 114/70 |
| 2,498,223 | 2/1950 | Rommel | 114/144 |
| 3,269,475 | 8/1966 | Voelker | 180/2 |
| 2,199,186 | 4/1940 | Quintana | 115/0.5x |

Primary Examiner—Andrew H. Farrell
Attorney—Hopgood and Calimafde

ABSTRACT: The invention contemplates a navigable vessel with means for accommodating one of a variety of types of wheeled vehicle. The vessel has provision for its own navigation from a control console or housing which is selectively positionable alongside the vehicle, for best adaptation to the particular vehicle. The nature and placement of the control console is to enable convenient navigation control, from a protected position within the vehicle or from a position outside the vehicle, as dictated by operator preference. The arrangement is such that no control readjustment is necessary, in the adaptation of the vessel to vehicles of different sizes and shapes and to various operator preferences as to mode of operation.

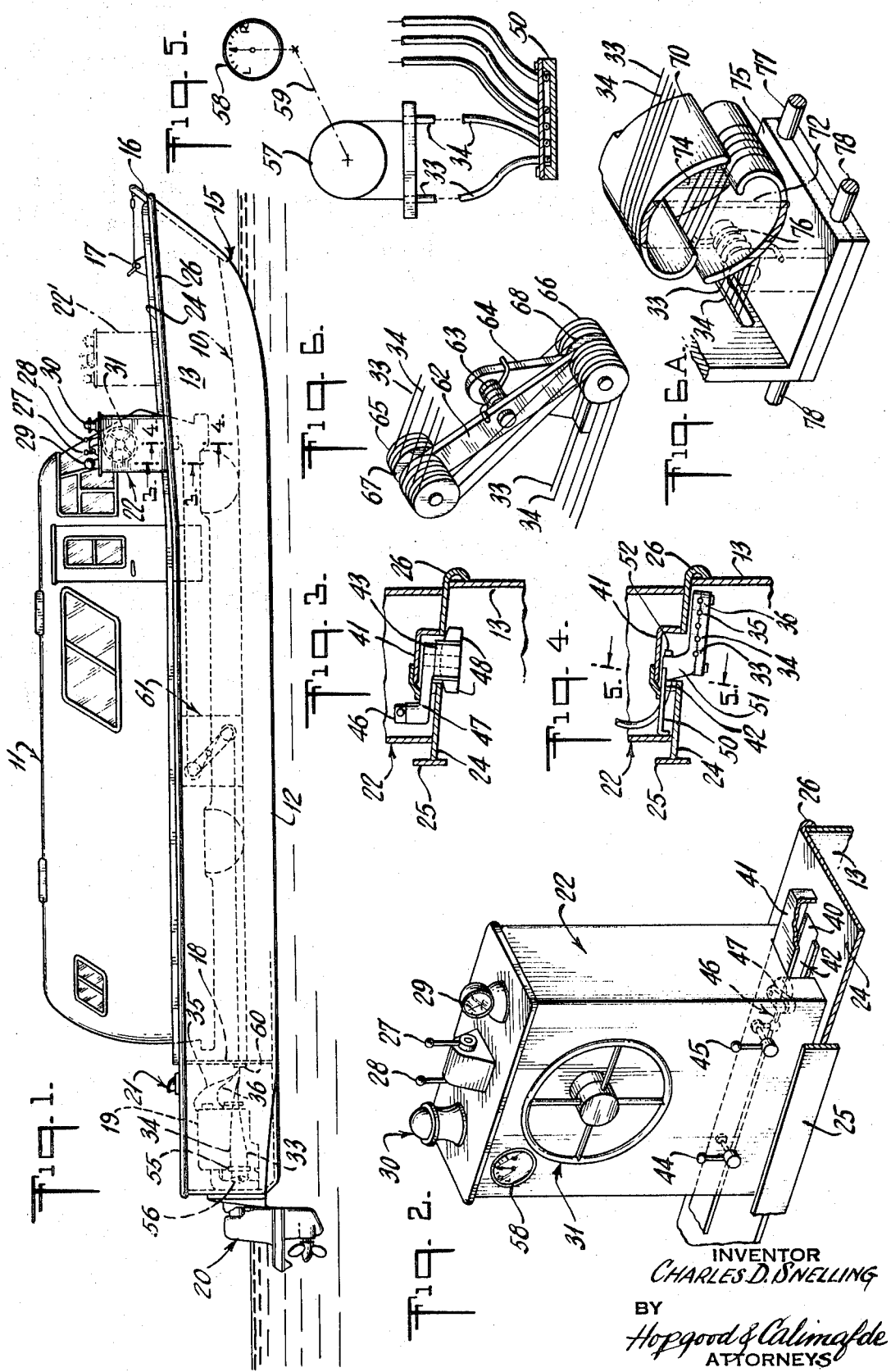

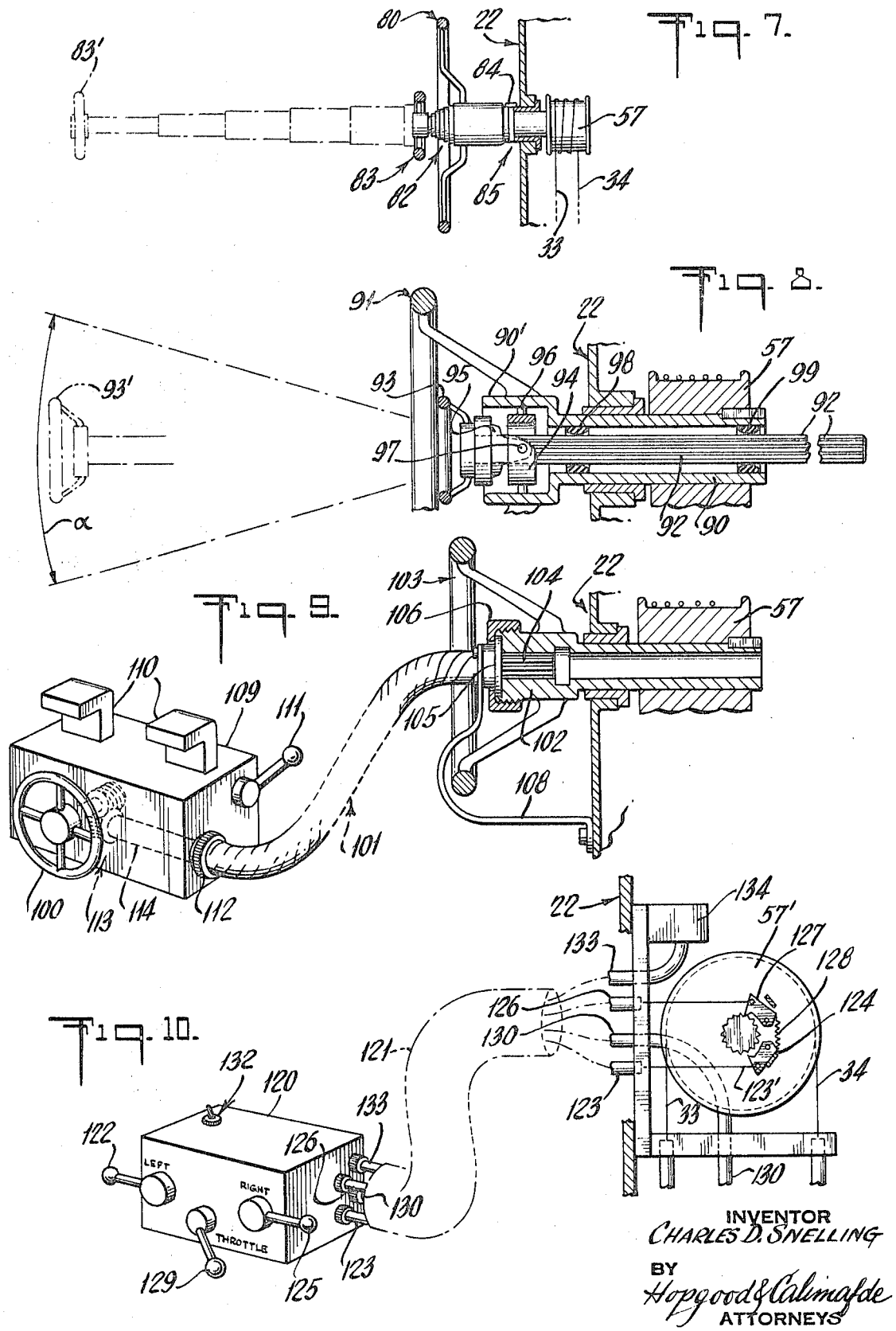

NAVIGATION CONTROL MECHANISM

This invention relates to control means for a navigable vessel, particularly for such a vessel which is adapted to accommodate a road vehicle.

Camping vacationers are demanding greater variety, scope and luxury in the physical equipment to support their activities away from home. House trailers, camping trailers, camper bodies, camper buses, so-called motor homes, and even elaborate collapsible devices such as tents and combination trailer-tents, all reflect the need for maximum creature comfort, within a person's means in his enjoyment of his home away from home. In like manner, the growing popularity of houseboats with great varieties of physical comfort features reflect the same kind of need, in the context of waterborne outdoor enjoyment and living. The problem is that whether it be a motor-home vehicle or a houseboat, the investment is substantial and usually represents commitment by the individual in favor of one to the exclusion of the other of these basic kinds of luxury equipments.

According to my invention, this limitation to one or other of vehicular versus waterborne outdoor living may be eliminated.

It is an object of the invention to provide a navigable vessel which will inherently accommodate one or a variety of sizes and styles of vehicle, with such flexibility of control adaptation that the vessel may be operated from within the vehicle.

It is a specific object to achieve the above object with control mechanism that may be selectively operated from within or without the vehicle, depending upon the convenience of the user, as for example may be dictated by the weather.

Another specific object is to achieve the foregoing objects with basically simple and foolproof structure, which may be introduced within the vehicle by way of an "umbilical" connection through only a partial opening of the vehicle window.

Other objects and various further features of novelty and invention will be pointed out or will occur to those skilled in the art from a reading of the following specification in conjunction with the accompanying drawings. In said drawings, which show, for illustrative purposes only, various forms of the invention:

FIG. 1 is a simplified view in side elevation of a navigable barge accommodating a camper bus or motor-home vehicle and equipped with control means of the invention;

FIG. 2 is an enlarged fragmentary view in perspective to show the control console or housing of FIG. 1 and related vessel parts to which it is mounted;

FIGS. 3 and 4 are enlarged fragmentary sectional views, taken respectively at the planes designated generally 3-3 and 4-4 in FIG. 1;

FIG. 5 is a simplified schematic layout of some of the control mechanism within the control console or housing;

FIGS. 6 and 6A are simplified views in perspective showing alternate slack takeup mechanism for use in the barge of FIG. 1, the device of FIG. 6 being depicted in dashed outline in FIG. 1;

FIG. 7 is a fragmentary view, partly in section on a rotary axis, to show a first control element, as an optional modification of that shown in FIG. 2;

FIG. 8 is an enlarged sectional view showing a modification of FIG. 7;

FIG. 9 is another sectional view of a modified control element, with schematic indication of remote operating parts; and FIG. 10 is a schematic representation of further modified control means.

Briefly stated, the invention contemplates a navigable vessel with means for accommodating one of a variety of types of wheeled vehicle. The vessel has provision for its own navigation from a control console or housing which is selectively positionable alongside the vehicle, for best adaptation to the particular vehicle. The nature and placement of the control console is to enable convenient navigation control, from a protected position within the vehicle or from a position outside the vehicle, as dictated by operator preference. The arrangement is such that no control readjustment is necessary, in the adaptation of the vessel to vehicles of different sizes and shapes and to various operator preferences as to mode of operation.

Referring to FIG. 1 of the drawings, the invention is shown in application to a navigable vessel or barge having a positively buoyant bottom which provides an elongated floor or platform 10 for the support of a road vehicle, such as a camper bus or motor home 11. The bottom may be of suitably braced cellular construction, between the floor 10 and bottom paneling 12, the intervening volume being filled with suitable flotation such as air-foam plastic, for safety purposes. The width of the vessel is defined by upstanding sidewalls, such as wall 13, contiguous with the bottom paneling 12 and with a stern transom 14. At the forward end, the floor 10 meets the hinge location 15 for a bow ramp 16, actuable by winch 17 between an upper or closed position (shown in solid outline) and a down or loading position (shown by phantom outline 17'). The buoyancy of the described hull structure is such as to assure ramp hinging above the waterline, when loaded.

The vessel incorporates its own propulsion and steering mechanism in a stern compartment, extending between an inside wall 18 and the transom 14. Illustrative of such mechanism is an inboard-outboard drive, including one or more engines 19 and one or more steerable outboard propulsion units 20, affixed to and driven through the transom 14. The stern compartment may be closed by suitable decking, with provision for access, including vent access suggested at 21.

In accordance with the invention, remote control for the vessel's propulsion and steering mechanism is afforded to the vehicle operator with flexibility to suit his convenience, whether he be seated in his vehicle or standing outside. For this purpose, I provide an upstanding control console or housing 22 located convenient to an openable side window, such as the slide window 23 of the vehicle 11. As best seen in connection with FIG. 2, the console 22 may b be carried by a narrow elongated walkway or decking strip 24 between a coaming 25 and the sidewall 13. For protection, the outer wall of the console is supported inside a protective guard, bead or rub strip 26.

Controls available at console 22 may include engine controls, such as the twin individual throttle actuators 27-28 (in the event of a dual inboard-outboard installation), a tachometer display 28, a compass 30, and a steering actuator such as the wheel 31. Connection of all mechanical actuators to the remote propulsion, steering or other device to be controlled, is by way of flexible cabling sometimes known as Bowden wires, and an excess of length is provided. The same flexibility of cabling characterizes connection of instrument displays, such as tachometer 29, to its remote sensing means, as at engine 19. In the engine compartment of FIG. 1, first and second actuator cables 33-34 are shown for positive control of steering, a single cable 35 is shown for the throttle control of engine 19, and a sensing cable connection 36 is shown for the tachometer pickoff.

For selective accommodation to different sizes and length of vehicles, the console 22 may be variously adjustably positioned along the side deck strip 24, a readjusted forward position being shown at phantom outline 22' in FIG. 1. To facilitate such adjustment, elongated guide means coact between deck 24 and console 22. Such guide means is shown as an elongated slot 40 in deck 24; and, if desired, for protection against weather, a raised ledge 41 may overlap the slot opening to present only side access to the slot 40, at 42, on the inboard side. Also, if desired, a resilient flap or seal strip 41' bonded to the projecting edge of ledge 41 may normally lie vertically down to close the side-access opening 42, except for such internal console projections as extend into slot 40 and merely locally raise the seal strip 41', as shown in FIGS. 3 and 4.

The means carried by the console for locating the same with respect to slot 40 may comprise longitudinally spaced lugs or projections 43, with provision for releasable locking engagement to spaced locations along slot 40. Each such locking device is shown to include its own external actuator or crank 44–45, with suitable internal linkage means 46, to drive a crank 47 (FIG. 3); crank 47 enters the side-access opening 42 to operate locking bolts 48 for releasable engagement with deck plate 24 at slot 40. Once clamped, by manual operation at 44–45, the console 22 remains secure in its selected location along guide means 40.

At a longitudinally central region of console 22, there is provided further projecting bracket structure entering the access 42 for guiding the control cables from their actuators or displays at 22, to a concealed alignement beneath the deck strip 24. Such bracket structure is suggested at 49 in FIG. 1 and is shown in greater detail in FIG. 4.

In FIG. 4, the control-cable guide bracket 49 is seen to comprise essentially two parts 50–51. Part 50 is a bracket or arm carried by and forming part of the console and so receiving the individual control cables, such as cable 33, that they are maintained in essentially the same general plane of part 50, at their passage through the side-access opening 42. Part 51 is an offsetting arm which also guides and supports the various cables for passage through slot 40 and which at the same time holds them in laterally spaced horizontal alignment beneath the deck strip 24, for relay to the engine compartment; a cable-clamp mechanism is shown positioning cables 33–34–35–36 in this manner, and the two bracket parts 50–51 are shown bolted together at 52.

As noted above, these cables which involve mechanical actuating movement are of the so-called Bowden wire variety, i.e., an axially flexible inner wire or cable is axially movable within an axially flexible sheath, which is also longitudinally relatively incompressible. By way of example, two such cables 33–34 are used for steering control, each being operated with its inner wire in tension, for positive right-to-left rudder displacements (via tensed displacement of the wire within cable 33) or for positive left-to-right rudder displacements (via tensed displacement of the wire within cable 34), as the case may be. For such purposes, at the stern end, the respective sheaths for cables 33–34 are clamped by means 55 immediately adjacent a rocker actuator 56 forming part of the steering mechanism of the inboard-outboard unit 20. The inner control wires of these cables are secured to opposite ends of rocker 56. These cables pass, with excessive length, beneath the decking strip 24, to the point of clamping at 51, at the lower extreme of the console assembly. Cables 33–34 (and the other cables that may be involved) then pass through the guiding bracket structure 50–51 to the interior of console 22, and FIG. 5 schematically indicates their connection to the steering actuator or drum 57, on the shaft of wheel 31. A clamp 51 securely references (to the console frame) the ends of sheaths of cables 33–34, adjacent their wire connections to opposite sides of drum 57. It will be understood that these wires may each helically wrap the drum for several revolutions, to ensure more positive steering actuation, regardless of direction, and of course each such wire may be secured to drum 57 to avoid slip. In view of the positive direct connection of wheel 31 to the stern-mounted steering element 56, a direct pickoff may be taken from drum rotation to a display instrument 58, in order to indicate rudder position. The synchronizing connection shown at 59 will be understood to incorporate reduction gearing, as necessary, for a realistic display of the instantaneous rudder position.

It is a feature of the invention that, regardless of the selected console position, the control cabling connections will not require readjustment. This feature is achieved by providing an excess of cable length, between console 22 and the point of entry into the stern (or engine) compartment, where a cable-sheath clamp 60 is suggested on wall 18. Of course, the unused excess of cable may be allowed to drop and lie in the space beneath deck strip 24, but I prefer to employ a slack takeup mechanism which will assure the orderly positioning of cables at all times. A first such takeup mechanism 61 is suggested by dashed outlines in FIG. 1 and is shown in perspective in FIG. 6.

Essentially, the slack takeup of FIG. 6 comprises a rocker arm 62, centrally pivoted on a horizontal axis or shaft 63 at the upper end of a standard or bracket 64. Plural idler rolls or sheaves are clustered on horizontal axes at the respective ends of arm 62. Thus, cable 33 is accommodated by first opposed corresponding sheaves 65–66 determining a zigzag takeup course, and adjacent cable 34 is similarly accommodated by adjacent corresponding sheaves 67–68. Other sheave pairs similarly accommodate such other cables as are involved, in closely adjacent parallel courses. A torsion spring 69, reacting between bracket 64 and arm 62 and about shaft 63, rotates arm 62 counterclockwise to the extent needed to take up cable slack, as will be understood.

In the alternative slack takeup arrangement of FIG. 6A, the slack cable group is wrapped over opposed semicylindrical halves 70–71 of a split drum, with cable reversal at the split. End structure such as a diametrically extending strut 72 connects and spaces the halves 70–71 and is the means of mounting the same on a pivot shaft 73, which in turn is positioned (as by standard 74) above a base or support 75. Torsion-spring means 76 reacts between strut 72 and the base or support 75 to impart counterclockwise slack takeup torque to the drum 70–71, and because of the no-slip character of cable support on drum 70–71, the base is slidably guided, as on fixed longitudinal guide bars 77–78 which will be understood to be carried (by means not shown) beneath the deck strip 24. Thus, any slack takeup by the mechanism of FIG. 6A, as dictated by relocation of console 22, will result in guided displacement of the takeup mechanism, to the extent of one half the console displacement involved. But regardless of the displacement, all cables will be have been retained in neat and orderly array, and no control readjustments are needed.

Remaining FIGS. 7 to 10 illustrate variously modified flexible or extendable control elements for literally bringing into a vehicle-seat location the key vessel controls, for navigation under conditions of greater comfort, as desired. In FIG. 7, the steering-control wheel 80, journaled in the inboard wall of console 22, incorporates an enlarged hub 81 containing a nested plurality of telescopically extendable elements 82. The elements 82 are keyed to hub 81 and to each other, and also to a smaller steering wheel 83. When not in use, or when using the "outdoors" wheel 80, the auxiliary wheel 83 remains in the packed position shown, more or less contained within the dished shape of wheel 80. However, when it is desired to navigate from within a vehicle for which an openable window is opposite the steering controls, wheel 83 may be simply drawn through the open window, as to the extended position 83', shown in phantom outline. In the event that the window alignment necessitates some up-down or fore-aft adjustment in the positioning of wheel 83, then the "lockup" element (schematically shown at 84) on a universal joint or flexible coupling 85 may be released, to allow angular flexibility in the positioning of the telescopic shaft 82. The joint 85 will by understood as a torsionally rigid part of the shaft connection between hub 81 and drum 57; such connection assumes only the additional feature of axial flexibility, upon release of the lockup means 84.

FIG. 8 shows a modification wherein the hub or shaft 90 for wheel 91 is tubular, to accommodate the telescoped reception of a central shaft 92 for the auxiliary wheel 93. The central dished or hub portion 90' of shaft 90 is enlarged to receive a first or outer gimbal ring 94 from which a second or inner gimbal ring 95 is suspended. Ring 95 has splined engagement with shaft 92, and the gimbals are linked to hub portion 90' on mutually perpendicular axes 96–97, to permit universal action when wheel 93 and shaft 92 are extended. Low-friction guide bushings 98–99 within shaft 90 may be of resilient material, for noiseless retention of shaft 92 in its stowed position, shown in solid outline. When wheel 93 is extended to the position 93' shown in phantom outline, shaft 92 may be manipulated universally, within an angular range of freedom α as may be desired to permit maximum closure of the vehicle window through which the auxiliary wheel has been passed. It will be understood that a suitable protective bushing (not shown) on shaft 92 may be employed to protect the vehicle window or its frame from contact with the splines of shaft 92.

FIG. 9 illustrates a further embodiment in which the entire auxiliary wheel 100 and its flexible shafting means 101 are to the hub 102 of the primary wheel 103, whenever it is desired to navigate from within the vehicle 11. The hub 102 is shown internally splined for keyed engagement with the mating end 104 of a torsionally rigid axially flexible shaft within the nonrotating but axially flexible sheath of means 101. The splined end 104 includes a flange 105 to facilitate attachment, by screwcap 106 to the hub 102. The sheath is terminated, adjacent flange 105, by a boss 107 which is nonrotatably secured, as by an anchoring strap 108 which extends outside and around the lower side of wheel 103, for removable attachment to the console wall. At the operating end of the flexible connection, wheel 100 is shown journaled in an auxiliary housing 109 having means such as clamp lugs 110 with a suitable actuator 111 for removable attachment to an interior part of the vehicle, as to the flanged lower edge of the dashboard. The flexible sheath is releasably clamped by means 112 to the housing 109, and reduction-gearing 113 transmits steering torques to the extended end 114 of the torsionally rigid axially flexible shaft within means 101. It will be understood that the clamped mounting of the auxiliary housing 109 is a convenience feature; it also provides "tighter" response in steering control. However, if desired, the housing 109 may be held in the hand or in the lap of the operator.

The FIG. 10 arrangement again uses an auxiliary control housing 120 which may be clamped within the vehicle or may be hand held, for vessel navigation. However, in FIG. 10, all mechanical control actuations utilize Bowden cables, collected as a group within a single flexible sheath 121 which constitutes the "umbilical" control connection from the vehicle to the vessel, at console 22. For right-to-left steering, incremental one-way clutch or ratchet engagements to the steering drum 57' are imparted by escaping counterclockwise actuations of a "LEFT" control handle 122, by way of the Bowden cable 123; in the form shown, the associated wire 123' operates a first pawl 124 to impart clockwise rotation to drum 57' for each such LEFT actuation. In like manner, "RIGHT" (i.e., left-to-right) increments of rudder displacement are generated by escaping clockwise action at handle 125, via Bowden cable 126 and another, but oppositely running pawl 127. A spring 128 normally holds pawls 124—127 in disengaged position, so that wheel steering at 31, in the manner already described, is equally available. The housing 120 is shown additionally to include a throttle actuator 129 having its own Bowden cable connection 130 contained within sheath 121 to the console 22. Also, the housing 120 may carry various electrical controls for operation of the vessel; these are symbolized by an ignition switch 132 with a flexible electrical cable connection 133 to a suitable junction box 134 within console 22. As already noted, all cables are preferably carried within the same sheath 121, and because the auxiliary mechanical control are normally disengaged, as described for the action of spring 128, there is no need to disconnect the umbilical assembly 121 from console 22. Preferably, this assembly, including housing 121, issues from the stern-facing sidewall of console 22, and may be simply stowed in a small locker (not shown) in that wall, when not in use.

It will be seen that I have described an improved navigation control system for a vessel, substantially extending the flexibility of use of the vessel, and also making possible extended use of the vehicle carried by the vessel. The controls are basically simple and foolproof, and therefore do not materially add to the cost of manufacture. In general, the control system makes it possible for anyone to use his automobile or camper in greatly extended range of operation, at modest cost, and with great convenience and comfort.

While the invention has been described in detail for the forms shown, it will be understood that modifications may be made without departing from the scope of the invention as defined in the claims which follow.

I claim:

1. A buoyant vessel including elongated support means for selectively bearing a wheeled vehicle, said vessel including propulsion and steering means, said vessel including elongated sides between which the vehicle is accommodated, and control means remote from said propulsion and steering means and carried at one of said sides, said control means comprising a housing and means for selectively positioning said housing at various longitudinal locations along one of said sides, s said control means including steering and propulsion control actuators, and means including flexible connection between said actuators and said propulsion and steering means, whereby depending upon the size of vehicle supported by said vessel, said control means may be selectively positioned, as for example, adjacent a seat window of the particular vehicle.

2. A vessel according to cal claim 1, in which said flexible connection includes a flexible tube with a cable longitudinally positionable within and guided by said tube.

3. A vessel according to claim 1, in which at one end of said flexible connection said tube is securely referenced to said housing and said cable is connected to an actuator, and in which at the other end of said said flexible connection said tube is securely referenced to said vessel and said cable is connected to said first-defined means.

4. A vessel according to claim 1, and releasable clamp means coacting between said housing and said one side for securing a selected longitudinal position of said housing.

5. A vessel according to claim 1, in which elongated guide means coact between said housing and said one side to determine an alignment of selective positioning for said housing.

6. A vessel according to claim 5, in which said side includes a coaming and elongated decking between said coaming and the adjacent edge of the vessel, said decking having an elongated slot forming part of said guide means, said flexible connection extending through said slot, whereby said housing may be above said decking and said flexible connection may be protected beneath said decking.

7. A vessel according to claim 6, in which said flexible connection includes slack takeup means, whereby said flexible connection adapts itself to changed length upon adjusted relocation of said housing.

8. A vessel according to claim 1, in which said control means includes a manually operable member with a flexible connection to one of said actuators.

9. A vessel according to claim 1, in which said control means includes a manually operable member with a selectively extendable connection to one of said actuators.

10. A buoyant vessel including elongated support means for selectively transporting a wheeled vehicle, said vessel including propulsion and steering means, a said vessel including elongated sides between which the vehicle is accommodated, and control means remote from said propulsion and steering means and carried at one of said sides in the vicinity of a vehicle window, said control means comprising movable structure remote from said propulsion and steering means and extending to substantially vehicle-window elevation, said structure being selectively positionable at various longitudinal locations along said one side, said control means including manual steering and propulsion control actuators carried by said structure and connected to said propulsion and steering means, said control means further including a manually operable member with a flexible connection to one of said actuators, said flexible connection being of length adequate to extend from one actuator to and through an adjacent vehicle-window opening.

11. A vessel according to claim 10, in which said last-mentioned flexible connection is torsionally rigid and axially flexible.

12. A vessel according to claim 10, in which said last-mentioned flexible connection includes an axially flexible tube with an axially movable cable contained therein.

13. A vessel according to claim 10, in which said flexible connection is detachably secured to said one actuator.

14. A vessel according to claim 10, in which said flexible connection comprises plural flexible connecting members in a common axially flexible sheath.

15. A vessel according to claim 14, in which one of said flexible connecting members includes electrically conducting elements.

16. A buoyant vessel including elongated support means for selectively transporting a wheeled vehicle, said vessel including propulsion and steering means, said vessel including elongated sides between which the vehicle is accommodated, and control means remote from said propulsion and steering means and carried at one of said sides in the vicinity of a vehicle window, said control means comprising movable structure remote from said propulsion and steering means and extending to substantially vehicle-window elevation, said structure being selectively positionable at various longitudinal locations along said one side, said control means including manual steering and propulsion control actuators carried by said structure and connected to said propulsion and steering means, said control means further including a manually operable member with a selectively extendable connection being of length adequate to extend from said one actuator to and through an adjacent vehicle-window opening.

17. A vessel according to claim 16, in which said extendable connection includes telescoping torsionally rigidly related elements.

18. A vessel according to claim 16, in which said extendable connection includes a universal joint.

19. A vessel according to claim 10, in which said manually operable member includes a base and manual element movably supported by said base, the flexible connection being to said manual element via said base.

20. A vessel according to claim 19, in which said base includes means for selectively removable attachment to a vehicle body part.

21. A buoyant vessel including elongated support means for selectively transporting a wheeled vehicle, said vessel including stern-mounted propulsion and steering means, said vessel including elongated upstanding sides between which the vehicle is accommodated, and a control console remote from said propulsion and steering means and selectively positionable along a forwardly located portion of one of said sides, said console including manually operable steering-control members and propulsion-control members and instrumentation display means at substantially vehicle-window elevation above said support means, sensing instrumentation carried by said vessel remote from said console, and flexible connecting means including connections connecting said control members to said propulsion and steering means and connecting said instrumentation to said display means, said flexible connecting means including a relatively axially flexible and longitudinally incompressible tube with a cable axially displaceably guided therein, and support means in common for a plurality of the individual flexible connections of said flexible connecting means.

22. The method of operating a buoyant vessel having an elongated support for selectively transporting a wheeled vehicle having an interior seat and a side window opening, said vessel having stern-mounted propulsion and steering means and a movable remote control element having flexible connection to said means, which comprises longitudinally positioning the vehicle on the vessel to achieve a navigable loaded posture of the vessel, longitudinally positioning and securing the movable element to the vessel in accordance with the positioning of the positioning of the window opening, introducing said movable element into said vehicle via the window opening, and navigating the loaded vessel from the interior of said vehicle.